US007721674B2

(12) United States Patent
Smith

(10) Patent No.: US 7,721,674 B2
(45) Date of Patent: *May 25, 2010

(54) EGG VACCINATION APPARATUS

(76) Inventor: David Fredrick Smith, Alameda Itanhaem, 373 Residential III, Santana de Pamalba, SP 06542-142 (BR)

( * ) Notice: Subject to any disclaimer, the term of this patent is extended or adjusted under 35 U.S.C. 154(b) by 646 days.

This patent is subject to a terminal disclaimer.

(21) Appl. No.: 11/584,775

(22) Filed: Oct. 20, 2006

(65) Prior Publication Data

US 2007/0255216 A1 Nov. 1, 2007

(30) Foreign Application Priority Data

Apr. 17, 2006 (BR) ................................ 8601558 U

(51) Int. Cl.
*A01K 45/00* (2006.01)

(52) U.S. Cl. ........................ 119/6.8; 606/108; 604/506; 604/93.01; 604/115; 604/116

(58) Field of Classification Search .................. 119/6.8; 606/108; 604/506, 93.1, 115, 116
See application file for complete search history.

(56) References Cited

U.S. PATENT DOCUMENTS 3,641,998 A 2/1972 Lyon et al.
3,964,481 A 6/1976 Gourlandt et al.
4,108,176 A 8/1978 Walden
4,177,710 A 12/1979 Matuschek et al.
4,276,879 A 7/1981 Yiournas
4,681,565 A 7/1987 Gourlandt
4,758,227 A 7/1988 Lancaster, Jr. et al.
4,863,443 A 9/1989 Hornung
5,056,464 A * 10/1991 Lewis ......................... 119/6.8
5,136,979 A * 8/1992 Paul et al. ..................... 119/6.8
5,176,101 A 1/1993 Paul et al.
5,312,353 A 5/1994 Boggess et al.
5,699,751 A 12/1997 Phelps et al.
RE35,973 E 12/1998 Paul et al.
6,032,612 A * 3/2000 Williams .................... 119/6.8
6,240,877 B1 * 6/2001 Bounds ....................... 119/6.8
6,286,455 B1 * 9/2001 Williams .................... 119/6.8
6,527,498 B2 3/2003 Chalker, II et al.
6,601,533 B1 * 8/2003 Bounds, Jr. .................. 119/6.8
6,668,753 B2 12/2003 Hebrank
6,789,467 B2 9/2004 Johnston, Jr. et al.
7,430,987 B2 * 10/2008 Smith ......................... 119/6.8
2003/0056729 A1 * 3/2003 Correa et al. ................ 119/6.8

(Continued)

*Primary Examiner*—Michael R Mansen
*Assistant Examiner*—Justin Benedik
(74) *Attorney, Agent, or Firm*—J. Charles Dougherty

(57) ABSTRACT

An automatic vaccinator of eggs, consisting of a system for applying vaccine with a vaccine chamber in which vaccine bags are hung and with an air bag that, when expanded, forces the vaccine from the bags and through tubing to a distribution manifold and the injectors, so that the vaccine is delivered to the eggs, is disclosed. A pressure sensor is installed in the distribution manifold and connected to a regulator, measuring the pressure in the distribution manifold at the point farthest from the vaccine chamber and controlling the pressure in the air bag to maintain a uniform quantity of vaccine being injected into the eggs and turning off the vaccinator if the pressure falls below a critical level, signaling that the vaccine bags are empty. The mechanical unit includes a system to support, align and secure the injectors over the egg tray, composed of two plates that work independently, a support plate and an alignment plate.

16 Claims, 8 Drawing Sheets

U.S. PATENT DOCUMENTS

| | | | | |
|---|---|---|---|---|
| 2003/0150387 | A1 | 8/2003 | Hebrank | |
| 2004/0144324 | A1 * | 7/2004 | Gross et al. | 119/6.8 |
| 2004/0163602 | A1 * | 8/2004 | Correa et al. | 119/6.8 |
| 2005/0284376 | A1 * | 12/2005 | Smith | 119/6.8 |

* cited by examiner

EGG VACCINATION APPARATUS

CROSS-REFERENCE TO RELATED APPLICATIONS

This application claims the benefit of Brazilian patent application No. MU8601558-3, filed on Apr. 17, 2006, for which the inventor is David Frederick Smith. Such application is fully incorporated herein by reference.

BACKGROUND OF THE INVENTION

The process of vaccinating eggs is important in the medical field and in poultry production. In medicine, eggs are used to incubate biological material utilized in the production of vaccines. In poultry production, the objective of in-egg vaccination is to protect the animals from endemic diseases.

Embryos receiving vaccine three days before hatching instead of the first day after hatching have more time to develop antibodies and consequently have a greater resistance to diseases. In this process, the vaccine ideally is applied directly into the amniotic fluid cavity of the egg, without penetration of the embryo. The incubation time for a chicken embryo is 21 days, and in-egg vaccination is normally performed three days prior to hatching, during the routine process of transferring the eggs from the incubator machine to the hatcher machine. The eggs that have previously been secured in incubator trays in which the eggs are fixed in a vertical position with the wider end of the egg up are now transferred in sets of one to four "flats" (trays) into hatcher baskets, where they are allowed to lay down in unencumbered positions so that they can hatch without injury.

The egg is composed of a shell, a membrane adhering to the inside of the shell, an interior membrane holding the embryo within the amniotic fluid, and an area between the two membranes holding the allantoidal fluid. As the egg is incubated, the outer membrane gradually separates from the shell, creating an air cell. This air cell is located in the top of the egg as per its position in the incubator tray. The process of vaccinating in-egg must be done with care to avoid cracking the egg shell or penetrating the embryo, either of which can be fatal to the embryo.

To distribute the vaccine to the injectors, the technology-taught by U.S. Pat. No. 6,240,877 utilizes a sealed pressurized air chamber constructed of rigid acrylic within which air pressure is applied to a collapsible plastic vaccine bag suspended within the chamber, forcing the liquid vaccine from the bag into the distribution system. The chamber is composed of a rigid acrylic chamber that is secured into a base plate, forming a tight seal. One or more vaccine bags are placed on a holder within the chamber that supports the bag in an upright position and flexible tubing is connected to an adapter on the bottom of the bag. The flexible tubing passes through a sealed "O" ring in the base of the chamber. This tubing is the vaccine distribution line and is connected to a distribution manifold that distributes the vaccine to the injectors. Compressed air is fed into the chamber and the vaccine bag is put under pressure in order to force the vaccine to the injectors. The injectors are opened and closed in a timed operation to deliver vaccine to the eggs.

A major problem with the device taught by the '877 patent is safety. The rigid acrylic chamber is kept constantly under pressure from compressed air. This pressure places strain on the internal surface area of the chamber, and as the stress of usage progresses the plastic begins to weaken. Furthermore, any mishandling of the chamber during cleaning or storage can cause fractures which might not be apparent to the operator. If this chamber should rupture while under pressure, shredded pieces of plastic could cause injury to the operators. Another serious problem with the device taught by the '877 patent could occur in the course of the routine working day when replacing the used vaccine bag for a new bag full of vaccine. To change the vaccine bag it is necessary to first remove all pressure from the chamber. If an inattentive employee does not drain the pressure before removing the chamber, the chamber would be forced off the base with an explosive pressure that could cause serious injury.

There is also a problem with the accuracy of vaccine dosage in the device taught by the '877 patent. To distribute vaccine into the vaccination system, the compressed air exerts pressure on the vaccine bag, forcing the vaccine into the flexible tubing leading to the vaccine distribution manifold. From the distribution manifold, the vaccine continues on to the individual injectors that receive a timed amount of vaccine. A problem occurs because of fluctuations in the pressure being exerted on the vaccine bag in the pressure chamber. This pressure is read and corrected within the chamber. However, the causes of the change in pressure occur at the individual needles where the vaccine is injected. When the needles puncture the eggs and the vaccine begins to be injected, there is an immediate drop in pressure in the vaccine line which influences how much vaccine flows through the line. The response to that pressure drop will only begin to occur when the pressure change reaches the chamber where the pressure sensor reads the drop and then more air pressure is applied. By that time, the injection process will have been completed and while more air pressure is being applied within the chamber, the vaccine lines are closed and pressure within the lines is increasing. In other words, by measuring the pressure in the pressure chamber at the farthest point from where the line opens and closes to deliver vaccine, the pressure control system is always working to compensate for changes that have already occurred, and this affects vaccine dosage. It can also affect the quality of the vaccine, which is pressure sensitive. If the pressure on the vaccine goes above 5 psi it can damage and perhaps crush the vaccine cells. Since the pressure in the device taught by the '877 patent is measured and controlled in the chamber, there are no direct controls on the pressure in the vaccine line. In fact, the pressure in the line is not known. Even though the pressure is maintained at a safe level in the chamber, it is possible that at the ends of the vaccine lines, the pressure can rise above that safe pressure level.

Finally, the device taught by the '877 patent has no automatic turn-off system when the vaccine bags are empty. If the operator does not notice that the vaccine bags are empty, the vaccinator continues to operate without injecting vaccine.

The current technology for a platform securing injectors over eggs to be injected is taught by U.S. Pat. No. 5,136,979. The device taught by the '979 patent utilizes a platform composed of two plates, a stabilizer plate and a tooling plate, which are attached together so that they raise and lower as one unit, with aligned holes in each through which injectors are guided. The plates are fixed to air cylinders that raise and lower the plates by the addition or subtraction of air. These air cylinders are secured to the vaccinator body. The entire tooling/stabilizer platform unit with injectors rests on the air cylinders that raise and lower the unit over flats of eggs so that when in movement, the plates and injectors are being propelled and supported by columns of air. In the resting position, the injectors are supported on the lower tooling plate. When the injectors are in position for injection, a narrow bladder located in the upper stabilizer plate is inflated with fluid to secure the superior portion of the injectors in place.

Shell punches to open the egg and needles to deliver the vaccine within those punches are located within the injectors, and are driven from the injectors by compressed air.

In the device taught by the '979 patent, the tooling/stabilizer plates lower the injectors over the eggs to be vaccinated until the injectors make contact with the eggs. In the process of settling on the eggs, the injectors are raised slightly above the stabilizer plate and then the injectors are secured in position by the inflation of the narrow fluid bladder located in the upper stabilizer plate, which is the plate farther away from the eggs and therefore in a less firm position for securing the injectors. The tooling/stabilizer plates are suspended from the body of the vaccinator by columns of air within the air cylinders. There are no brake locks on the plates to secure them in position. During the vaccination process, subtle vibrations are created in the plates that can cause cracks in the eggs. These vibrations are caused when there is a change in the equilibrium between the force of the injector propelling the punch and needle into the eggs and the force of the air pressure in the air cylinders securing the plates over the eggs. At the moment when the punch makes contact with the eggshell, the injectors are forced upward slightly, causing the air in the cylinders securing the plates to compress. The sudden impact of the eggshell being penetrated causes disequilibrium between the downward force of the injectors and the upper force of the air cylinders, causing a slight rise in the tooling/stabilizer plates causing a vibration that is transferred to the eggs. After penetration, there is an inverse downward pressure on the eggs until equilibrium is reached. This vibration can be harmful to the eggs, causing an uneven force of penetration and possibly cracks to the eggs when the plates come down after the air pressure in the injection device has been released.

In addition, the device taught by the '979 patent has a narrow fluid bladder located in the superior stabilizer portion of the stabilizer plate and a tooling plate that secures the injector once it is in contact with the egg. Because the bladder secures only the very top portion of the injector at the point most distant from the egg, there remains the possibility for lateral movement of the lower part of the injector when the punch and needle make contact with the egg, which can cause hairline cracks on the eggshell. These cracks can induce a loss of fluids from the egg and cause embryonic death. The further the fluid bladder securing the injector is from the point of contact with the egg, the greater the possibility of lateral movement, and the greater that lateral movement can be.

Furthermore, the device taught by the '979 patent utilizes a stabilizer plate and a tooling plate platform to support injectors in their proper orientation over the eggs. Each vaccinator is manufactured for one particular size and type of egg flat. Because eggs vary greatly in size, many hatcheries have two or more types of incubator egg flats with different configurations for larger and smaller sized eggs. In these hatcheries, the use of the device of the '979 patent requires a separate vaccinator machine for each type and size of egg flat.

Finally, contamination is a very major concern and must be controlled since any contaminant entering the hole made by the injector has the potential to kill the embryo. The device of the '979 patent has two plates fixed to one another and it is extremely difficult to sanitize the joints between the two plates.

SUMMARY OF THE INVENTION

The present invention has been designed to resolve the safety, vaccine dosage, and vaccine control issues of the '877 patent. The present invention does not pressurize its vaccine chamber but instead uses an air bladder inside the chamber in the preferred embodiment that physically presses the vaccine bags against the sides of the chamber, forcing the vaccine through the flexible tubing that carries it to the distribution manifold. With this system the chamber is not pressurized and there is no danger of explosion or the chamber being launched into the air if carelessly opened while under pressure. The vaccine bags are hung from a hanger fixed to the base plate and between the bags is an air bladder that when inflated is slightly larger than the vaccine chamber. When the chamber is closed and latched over the base plate, the air bladder is filled with air to the point that pressure is applied to the vaccine bags on either side. The pressure continues to build until the desired pressure as programmed by the computer controller has been obtained. However, the pressure is within the air bladder which would rip if there were some damage to its structure or at worst explode to release the air without propelling hard acrylic material which could injure operators.

The important issue of vaccine dosage as influenced by pressure in the delivery system is resolved by measuring the vaccine line pressure at the most distant point from the chamber on the vaccine distribution manifold. When the needles release vaccine into the eggs, and there is an immediate drop in vaccine line pressure, the pressure sensor located on the distribution manifold of the preferred embodiment immediately senses the drop in vaccine line pressure and sends a signal to the microprocessor controlled micro-pressure regulator, which instantly decreases the pressure in the air bladder. As the flow to the needles stops, the increased pressure in the vaccine line is also immediately sensed by the pressure sensor that repeats the process, to decrease the pressure in the air bladder, thereby maintaining a constant pressure in the vaccine distribution line. The system guarantees that the vaccine line pressure never surpasses 5 psi, which could damage vaccine cells and reduce the quality of vaccination. When the pressure in the system drops below 3 psi, this indicates that there is not enough vaccine in the vaccine bags to continue the vaccination process and the system shuts down automatically. This guarantees that no vaccination will be done without vaccine.

The present invention is directed to an apparatus that as part of the in-egg vaccinator controls the movement of the injector devices and is composed of two plates that operate independently from one another for specific purposes. The injector support plate is a plate that in certain embodiments may be fabricated from stainless steel with milled holes that are aligned according to the configuration of the eggs located in the incubator flat below it. The plate has a frame that is supported by two or more pneumatic air cylinders that raise and lower it. Individual injectors with needles that will perforate the eggshell and deliver the dosage of vaccine or other injectable material are fitted into the holes in the injector support plate. The caps on the injectors rest on the superior surface of the injector support plate. One of the principle features of the injector is a sensor located in the cap which emits signals when in contact with the injector support plate in order to control the passage of vaccine to the needle.

One of the major improvements in the present invention relative to the device taught by the '979 patent is to use two independent plates which operate separately and individually, an injector alignment plate located closest to the eggs that is affixed in position directly to the structure of the vaccinator, and an injector support plate located in a superior position to the injector alignment plate that moves the injectors in a vertical up and down movement through the injector alignment plate to put the injectors in contact with the eggs to be vaccinated. Once the injectors are in contact with the eggs, they are held firmly in place by air tubes located in the milled spaces within the injector alignment plate which is the plate closest to the eggs and, therefore, the firmest position for securing the injectors.

In certain embodiments the present invention features large diameter longitudinal air tubes that are inserted into the injector alignment plate, the plate which is located closest to the eggs, with one air tube placed between each row of injectors. These air tubes have at least two high-pressure pneumatic air valves that rapidly inject large quantities of compressed air, filling the air tubes quickly and applying pressure to large surface areas of the lower portion of the injectors. The location of the air tube is critical to its ability to secure the injectors firmly in place. The closer the tubes are to the point of contact with the eggs, the less mobility is possible. Because of the relative large size of the air bag in the preferred embodiment, the injectors are held in a rigid position when in contact with the egg, minimizing the possibility of vertical or lateral movement. With the injector thus secured and the injector alignment plate being firmly fixed to the machine, there is a reduced possibility of vibrations being passed from the injector to the egg at time of penetration.

The present invention presented herein has in a preferred embodiment an injector alignment plate and an independent injector support plate that can be exchanged for plates for different sizes and configurations to be used in the same vaccinator. Utilizing the two independent components, one to lift and lower the injectors and the other to guide and secure the injectors, changing the components is an easy task. This operation takes less than ten minutes and does not disrupt the in-egg vaccination process. The present invention will save investment in equipment over the device taught by the '979 patent, which requires two machines if two different types of egg flats are being utilized.

The present invention further, in a preferred embodiment, has an injector support plate independent of the injector alignment plate that permits the use of an injector that has an electronic sensor embedded in the cap, which rests on the injector support plate in its normal raised position. When the injector support is lowered over the eggs, the injector cap is raised by the egg through the hole in the injector support plate. If for any reason, such as infertile eggs removed during candling, there is an empty space in the egg flat, the injector does not lift up from the injector support plate. An electronic sensor embedded into the injector cap then sends an electronic signal to the microprocessor, which inhibits the injector from injecting vaccine into the empty space. The saving of vaccine by not injecting into empty spaces represents a cost savings, since infertile and dead embryos average 7 to 10% of the eggs being vaccinated.

Further in the preferred embodiment of the present invention, having two independent and easily removable plates, the injector support plate and the injector alignment plate, separate from one another makes injector sanitization much more efficient. With the injector support plate being-separate and removable from the injector alignment plate it is a simple matter to sanitize between the two independent plates.

The second plate, the injector alignment plate, of the preferred embodiment can be fabricated from Delrim plastic or other high-density material and has milled holes having the same configuration of holes as the injector support plate and slightly larger in diameter, in order to align the injectors over the eggs to be vaccinated and allow some lateral movement of the injectors as they descend over the eggs. This plate is attached to the structure of the egg injection machine. It is rigid and immovable.

With the injector alignment plate firmly in its position, the injector support plate with the injectors is lowered by the air cylinders of a preferred embodiment of the present invention until the injectors pass through the corresponding holes in the alignment plate. The holes in the injector alignment plate are larger in diameter than the holes in the injector support plate to allow a 360-degree lateral movement of the injectors within the injector alignment plate. Inside the injector alignment plate, parallel to each row of injectors, there are large diameter cylindrical pneumatic air tubes made of an expandable polymer material that when deflated allow the free passage of the injector through the injector alignment plate holes. When the injectors are lowered into place above the eggs, high-pressure compressed air is injected through high-speed, large-capacity pneumatic valves into each air bag at two or more air connections located in the tubes to insure rapid uniform inflation.

The air tubes inflated from both ends become rigid structures, pressing firmly against the injectors on either side to insure that the injectors are immobilized. The positioning of these air tubes inside the injector alignment plate is very important to the integrity of the eggs since the injectors are being secured at the point just above the needle exit, allowing no play in the injectors as the needles makes contact with the eggshell. The position of the air tubes in the injector alignment plate at the point of the injector closest to the egg insures that the injector will suffer the least possible lateral movement at the moment of impact of the injection needle into the egg.

These and other features, objects and advantages of the present invention, as described above with respect to certain preferred embodiments of the present invention, will become better understood from a consideration of the following detailed description of the preferred embodiments and appended claims, in conjunction with the drawings as described following:

DETAILED DESCRIPTION OF THE PREFERRED EMBODIMENTS

With reference now to FIGS. 1-9, detailed explanations of the preferred embodiment of the present invention will be given. The purpose of the drawings is to further the explanation of the preferred embodiment, without limiting the scope of the invention as claimed herein.

Figure 1:
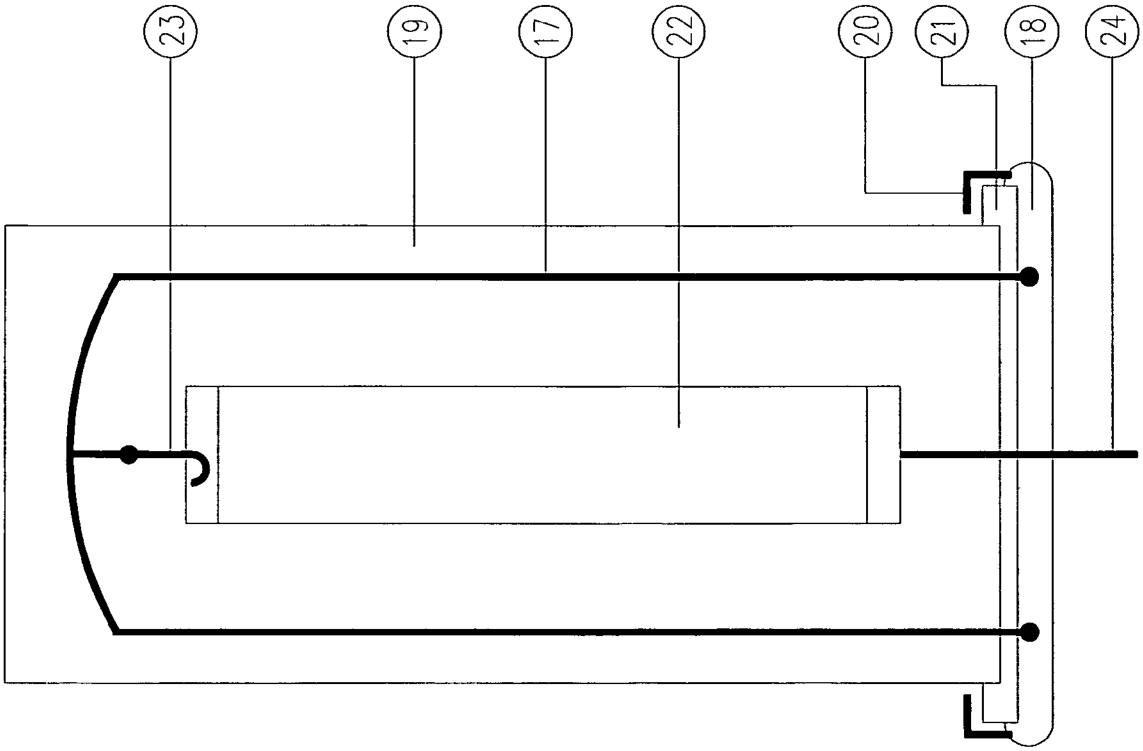
FIG. 1 shows the side view of the vaccine chamber of a preferred embodiment of the present invention before beginning the vaccination process, with the "U" support affixed to the aluminum base of the chamber and the acrylic top filled over the "U" support with quick-connect fasteners fitting over the lip of the chamber and the air bag suspended from one of the three "U" support hooks. The air bag air pressure line passes through the base of the chamber.

FIG. 1 shows the vaccine chamber before beginning the vaccination process with the "U" support 17 affixed to the aluminum base of the chamber 18 and the acrylic top 19 filled over the "U" support with quick connect fasteners 20 fitting over the lip of the chamber 21 and the air bag 22 suspended from one of the three "U" support hooks 23. The air bag feed line 24 passes through the base of the chamber.

Figure 2:
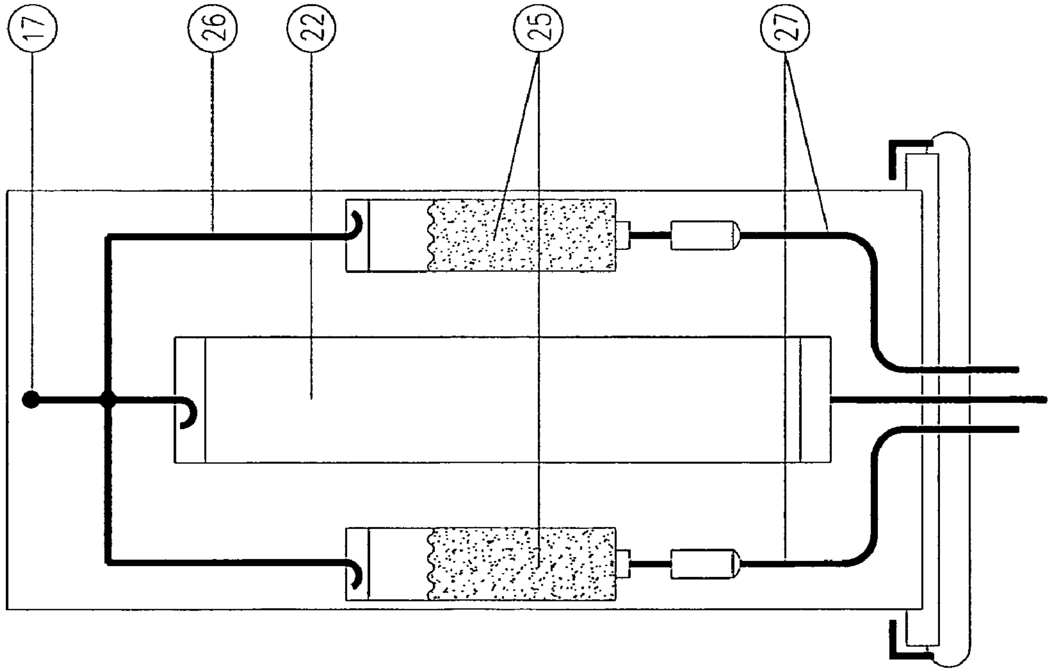
FIG. 2 shows the vaccine chamber front view of the vaccine chamber of a preferred embodiment of the present invention with two full vaccine bags before the vaccination process begins, suspended from hooks attached to the "U" structure and with vaccine tubing which is connected to the vaccination system. The air bag is deflated.

FIG. 2 shows the vaccine chamber rotated 90° to show the two full vaccine bags 25 before the vaccination process begins, suspended from hooks 26 attached to the "U" structure 17 and with vaccine tubing 27 which is connected to the vaccination system. The air bag 22 is deflated.

Figure 3:
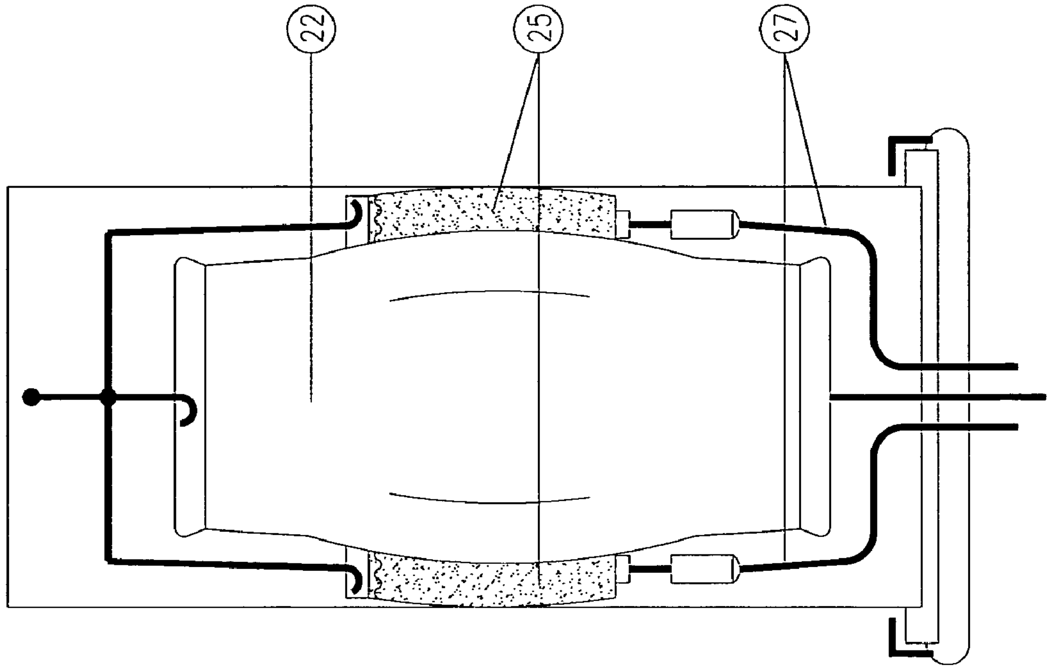
FIG. 3 shows the vaccine chamber of a preferred embodiment of the present invention during the vaccination process when the air bag is inflated, pressing against the vaccine bags and forcing the vaccine through the tubing and into the vaccination system.

FIG. 3 shows the vaccine chamber during the vaccination process when the air bag 22 is inflated, pressing against vaccine bags 25 and forcing the vaccine through tubing 27 and into the vaccination system.

Figure 4:
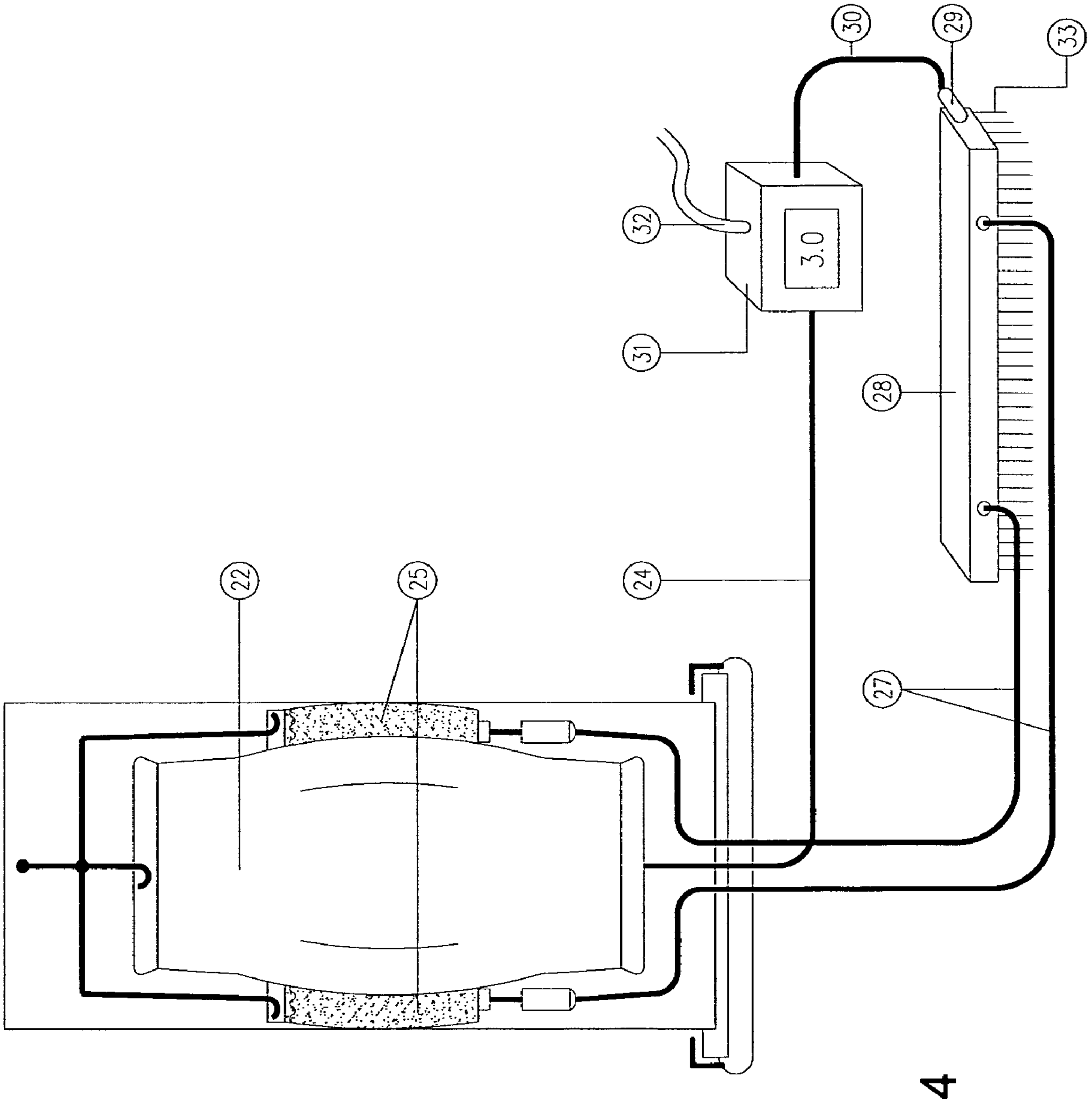
FIG. 4 shows the vaccine chamber of a preferred embodiment of the present invention during the vaccination process when the air bladder is inflated, pressing against the vaccine bags and forcing the vaccine through the tubing to the distribution manifold with the pressure sensor on the point furthest from the vaccine bags. The pressure sensor is attached by air line to the microprocessor-controlled, micro-pressure regulator, which is attached to the air bladder via the air pressure line.

FIG. 4 shows the vaccine chamber during the vaccination process when air bladder 22 is inflated, pressing against vaccine bags 25 and forcing the vaccine through tubing 27 to distribution manifold 28 and into vaccine lines 33, with pressure sensor 29 on the point furthest from vaccine bags 25. The pressure sensor 29 is attached by an electrical line 30 to the microprocessor-controlled pressure regulator 31 that receives air 32 from a compressor to feed air bladder 22 via air pressure line 24.

Figure 5:
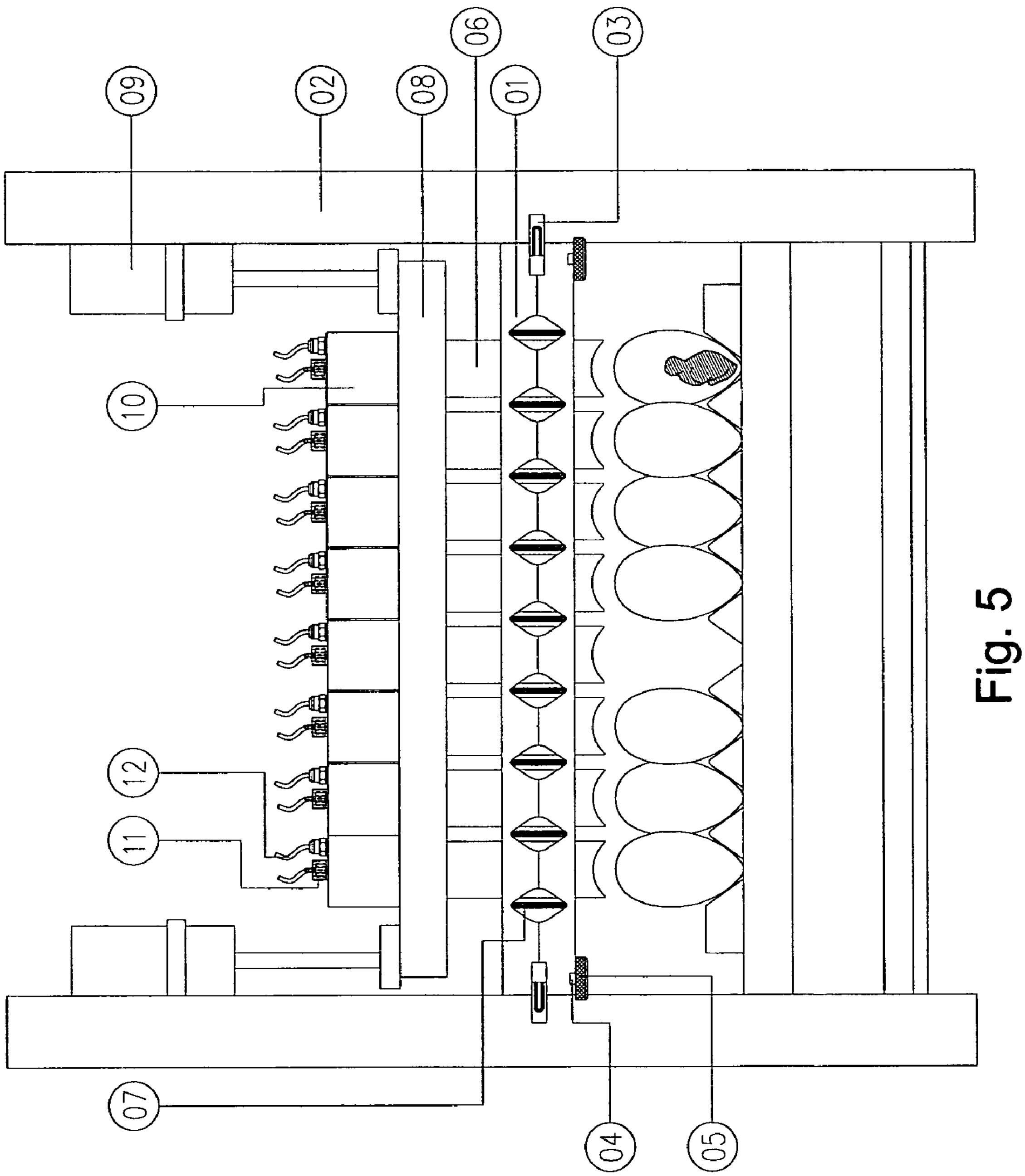
FIG. 5 is a side elevational view of the two plates of the preferred embodiment of the present invention, the injector alignment plate and the injector support plate, in the resting position before beginning the vaccination process, with the injector alignment plate affixed on the vaccinator structure and the injector support plate positioned on the base structure holding the pneumatic cylinders, and with the injectors resting on the injector support plate and the air tubes in the interior of the injector alignment plate deflated.

FIG. 5 shows the two plates, injector alignment plate 1 and injector support plate 8, before initiating the vaccination process, with injector alignment plate 1 affixed to the structure of the vaccinator 2 by quick connect fasteners 3 with the plate supported by alignment pins 4 in the structural supports 5. The injector alignment plate 1 has milled internal spaces that house air tubes 7 and circular openings through which pass injectors 6. The injector support plate 8 is supported in its framework affixed to air cylinders 9 in its resting position with caps 10 of injectors 6 resting on top of injector support plate 8 with a vaccine entrance valve 11 and a microprocessor-controlled sensor 12 to emit signals indicating the presence of eggs.

Figure 6:
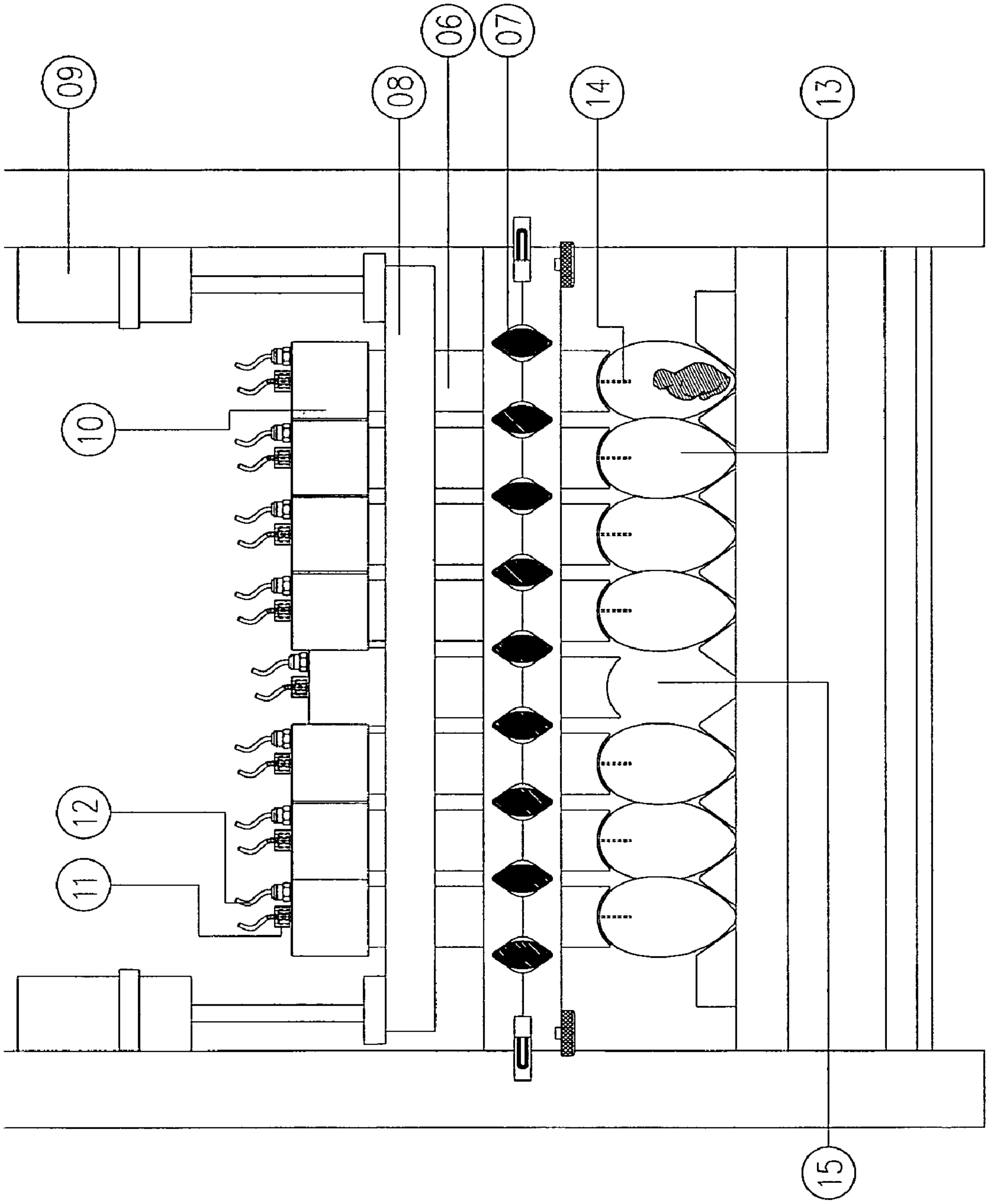
FIG. 6 is a side elevational view of the two plates of the preferred embodiment of the present invention, the injector alignment plate and the injector support plate, in position for vaccination, with the injector alignment plate in the same position as in FIG. 1 and the injector support plate at its lowest level, with the injectors resting on top of the eggs and the egg shells beings penetrated by the needles, and the caps of the injectors raised up from the injector support plate and the air tubes in the interior of the injector alignment plate inflated with air.

FIG. 6 shows the vaccination process in which the air cylinder 9 lowers injector support plate 8 to rest injectors 6 on eggs 13 and needles 14 penetrate the egg shell and inject the vaccine into eggs 13. The air tubes 7 inside injector alignment plate 1 are inflated with air in order to secure the injectors firmly in place, without movement, during the vaccination process. Because injectors 6 are resting on top of eggs 13 and not on injector support plate 8, the injector caps 10 are slightly raised from the injector support plate 8 and the microprocessor-controlled sensor 12 emits a signal to open vaccine entrance valve 11, allowing the vaccine to pass to each injector 6 and needle 14 to enter eggs 13. In places where eggs are missing 15, injector cap 10 continues to rest on injector support plate 8 and microprocessor-controlled sensor 12 emits a signal to maintain vaccine entrance valve 11 closed.

Figure 7:
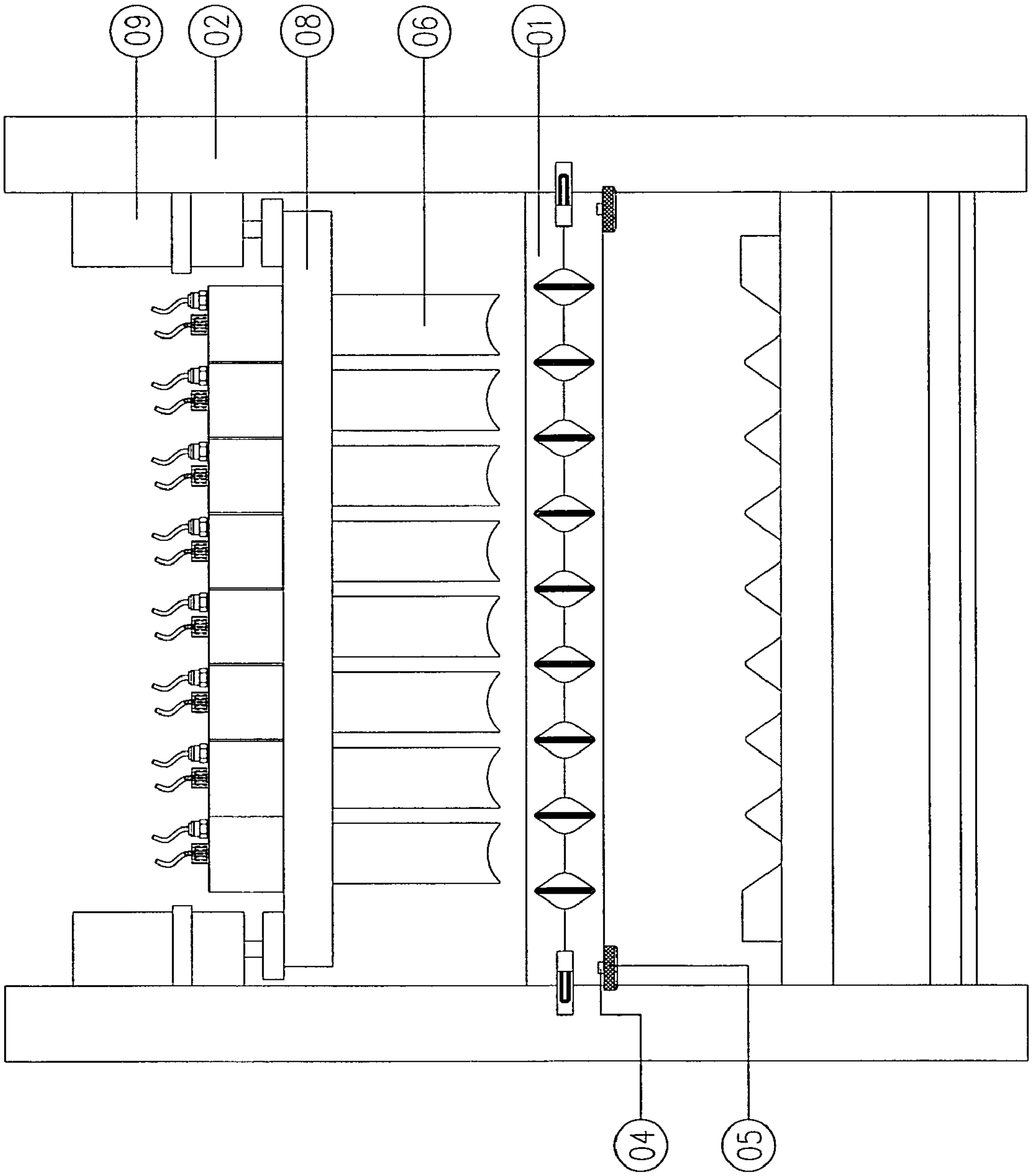
FIG. 7 is a side elevational view of the two plates of the preferred embodiment of the present invention, the injector alignment plate and the injector support plate, in position to exchange the plates for plates of different configurations, with the injector alignment plate in the same position as in FIGS. 1 and 2 and the injector support plate at its highest level, with the injectors raised in order to leave the injector alignment plate free to be removed from its quick connect fasteners.

FIG. 7 shows an interval in the vaccination process, when injector alignment plate 1 and injector support plate 8 are exchanged so that egg flats of a different configuration can be utilized with the same vaccinator apparatus. The air cylinders 9 lift injector support plate 8 to its highest point in order to remove injectors 6 from their spaces in injector alignment plate 1. The next step is to open quick-connect fasteners 3 and remove injector alignment plate 1 from alignment pins 4 and substitute the plate with another injector alignment plate 1 that will match the new configuration. Following this, injector support plate 8 is also substituted.

Figure 8:
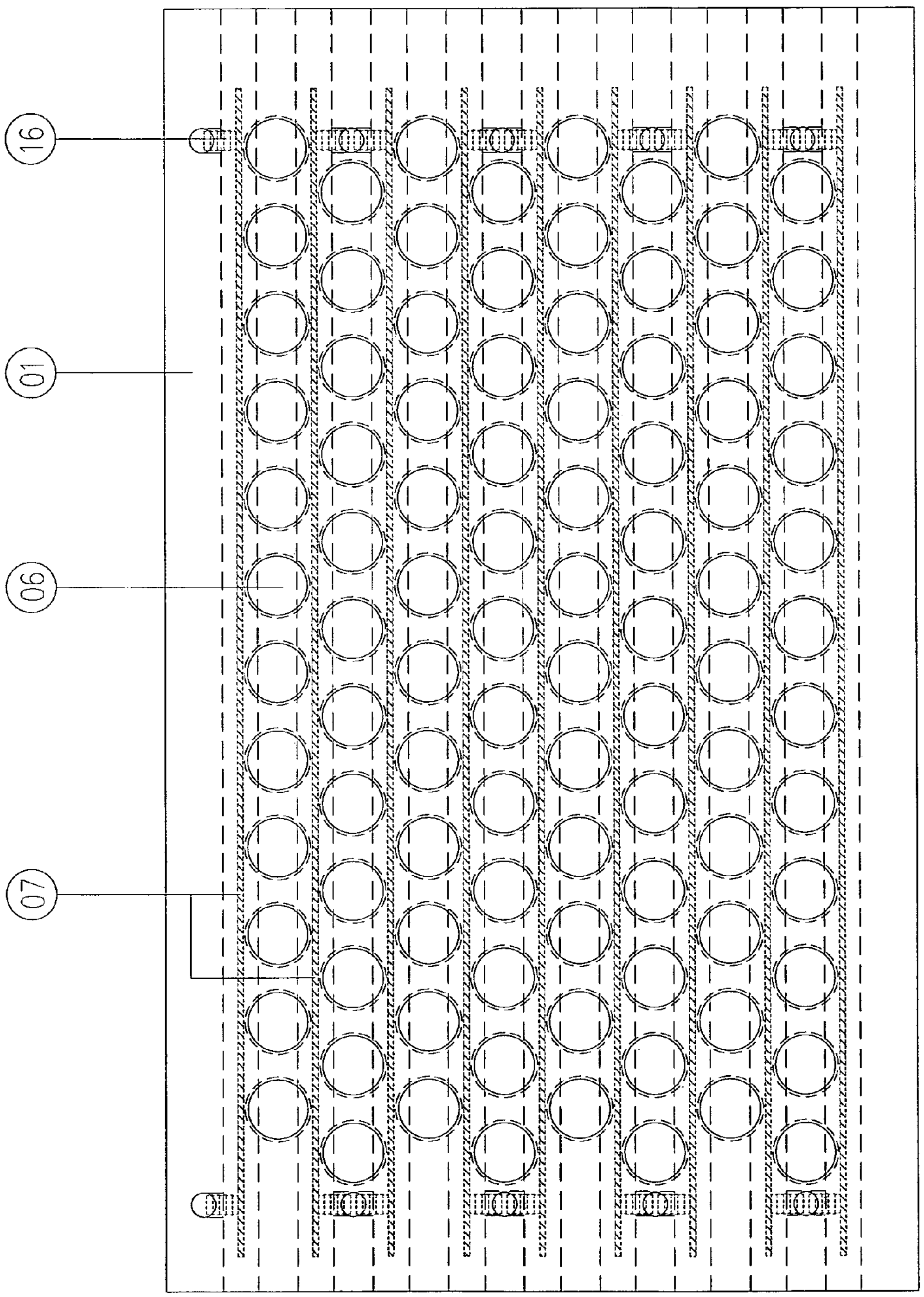
FIG. 8 is a cut-away view of the interior of the injector alignment plate of a preferred embodiment of the present invention, showing the air tubes deflated to allow free passage of the injectors through the milled openings.

FIG. 8 shows a superior view of injector alignment plate 1 with air tubes 7 in their longitudinal formation and connections 16 at the extremities of air tubes 7 for the addition and removal of compressed air, before initiating the vaccination process, and therefore, deflated, allowing the free passage of injectors 6 through their cylindrical spaces in injector alignment plate 1.

Figure 9:
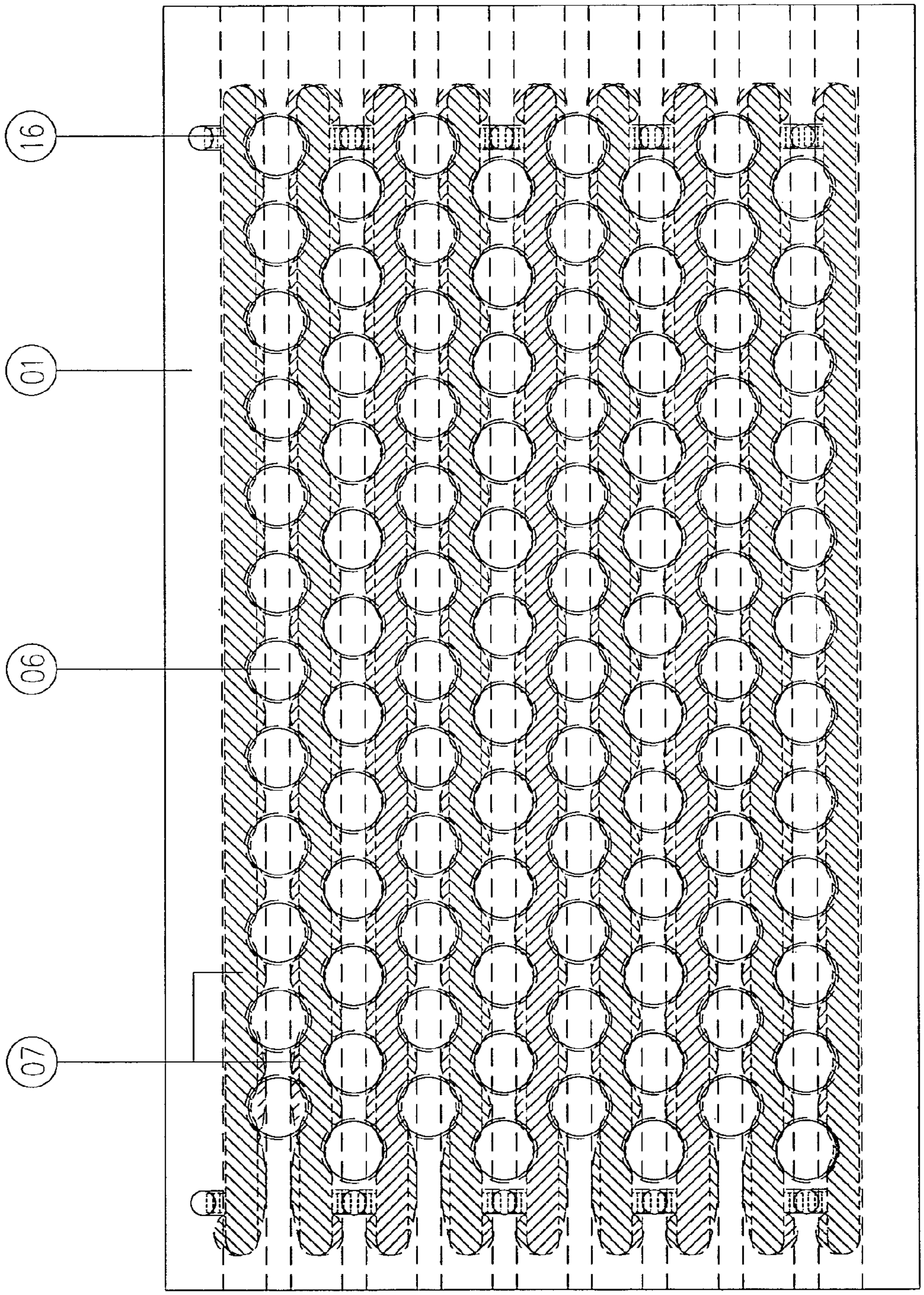
FIG. 9 is a cut-away view of the interior of the injector alignment plate of a preferred embodiment of the present invention showing the air tubes filled to maintain pressure over a large part of the body of the injector inside the plate.

FIG. 9 shows a superior view of injector alignment plate 1 with air tubes 7 in their longitudinal formation and connections 16 at the extremities of air tubes 7 for the addition and removal of compressed air, inflated during the vaccination process, and therefore, pressing against the bodies of injectors 6 to inhibit any lateral movement of the injectors.

Referring again now to FIG. 1, cylindrical vaccine chamber 19 of the preferred embodiment of the present invention, constructed of hard transparent material such as acrylic, is fixed to aluminum base 18 by quick connects latches 20. There is no air-tight connection between vaccine chamber 19 and aluminum base 18. Fixed to aluminum base 18 inside vaccine chamber 19 is a stainless steel support 17 for air bladder 22 and, as shown in FIGS. 2 and 3, two vaccine bags 25. Support 17 is in the form of an inverted "U". The open end of the "U", two parallel bars, are fixed to base plate 18. The bars are parallel and within a few millimeters of the sides of vaccine chamber 19 and serve as a guide to align vaccine chamber 19 over base plate 18. In the center of the closed end of the "U" there is a hook 23 from which is suspended air bladder 22. On either side of the air bladder hook 23 are located hooks 26 for the vaccine bags.

Base plate 18 has three holes near the center of the plate. One hole is for air pressure line 24 that is connected to air bladder 22 and the other two are for vaccine bags 25.

On start up of operation, with the device of the preferred embodiment of the present invention turned off, latches 20 securing vaccine chamber 19 to base plate 18 are released and vaccine chamber 19 is removed from base plate 18. Two vaccine bags 25 are hung from vaccine bag hooks 23 on "U" support 17. Special needles are attached to the two vaccine lines 27 passing through base plate 18 and these needles are pushed into place in the exit ports of vaccine bags 25. Vaccine chamber 19 is then replaced over the support securing air bladder 22 and the vaccine bags 25 and fastened to base plate 18 with quick connectors 20.

The device is now ready to be operated. When the vaccinator is turned on, the CPU verifies that the line pressure in distribution manifold 28, as shown in FIG. 4, is low and air pressure is applied to air bladder 22 in vaccine chamber 19. At the same time the CPU automatically opens a purge distribution manifold valve to allow vaccine to flow into distribution manifold 28. When air has been purged from distribution manifold 28, the purge distribution manifold valve is turned off. The next step is to purge vaccine lines 33 from distribution manifold 28 to needles 14. This is done manually by pressing the purge needle button on the touch screen.

Once air from vaccine lines 33 has been purged, the vaccinator is ready to operate. If the operators are not cautious and allow vaccine bags 25 to empty their contents before changing, the device automatically stops when the vaccine no longer is being forced from vaccine bags 25. When there is no pressure from vaccine entering into distribution manifold 28, the pressure will drop below 3.0 psi and the system will automatically shut down until new vaccine bags 25 have been placed in vaccine chamber 19.

The vaccination process proceeds as follows, as shown in FIGS. 5 and 6: An incubator egg flat is introduced into the vaccinator structure 2 and electronic sensors activate the injector support plate air cylinders 9, lowering the injector support plate 8 and injectors 6. These injectors 6 pass freely through the injector alignment plate 1 until they reach the eggs 13. The eggs 13 in the incubator flats are normally at slight angles to the perpendicular injector alignment plate 1 above them. As injectors 6 come in contact with eggs 13, the larger diameter of the openings in injector alignment plate 1 allows injectors 6 to adjust to the angle of eggs 13, so that needles 14 will penetrate them perpendicularly.

When injector support plate 8 has reached its lowest point and injectors 6 are resting on eggs 13, the electronic controls activate high-pressure air valves to fill air tubes 7 located inside the injector alignment plate 1, as shown in FIG. 6. These air tubes 7 are positioned between the rows of injectors 6 and on their outsides, as shown deflated in FIG. 8 and inflated in FIG. 9. Once inflated, they completely fill all available space in the chamber, exerting a constant pressure on all the exposed surface area of injectors 6. The position of the injector alignment plate 1, closest to the needle 14 exit on each injector 6, is the most ideal for firmly securing the injectors 6 since the origin of vibrations that can cause egg cracks comes from the needle 14 impact with the shell of eggs 13.

When injectors 6 come to rest on eggs 13, the injector caps 10 which have been resting on the upper side of the injector support plate 8 are slightly raised. If there is no egg 13 under any one injector 6, as when an infertile egg had been removed during a previous candling process, that injector cap 10 will remain resting on the injector support plate 8. The sensor in the injector cap 10 sends an electronic signal to the computer and no vaccine is released into that injector's needle 14.

After each of the eggs 13 have been injected, the electronic controls signal the high-capacity pneumatic dump valves to remove the compressed air from air tubes 7, eliminating the pressure against the injectors 6 inside the injector alignment plate 1, leaving them to move freely. The injector support plate 8 is raised to its starting position, removing injectors 6 from contact with eggs 13.

Hatcheries will often have incubator flats with different configurations to accommodate variations in egg 13 size. The injector support and injector alignment plates, 8 and 1, respectively, are milled for a specific egg flat configuration. However, the preferred embodiment is designed for an easy and rapid exchange of plates so that one vaccinator can be used with all of the configurations of flats manufactured for any one model of incubator. To do the plate exchange, electronic controls signal pneumatic air cylinders 9 to raise injector support plate 8 to its highest position, as shown in FIG. 7, removing in this process injectors 6 from injector alignment plate 1. With injector alignment plate 1 free of injectors 6, injector alignment plate 1 is removed by undoing quick-connect fasteners 3 securing injector alignment plate 1 to vaccinator frame 2, removing it from alignment pins 4 and substituting it with the appropriate injector alignment plate 1 for the next incubator egg flat to be injected. Then through the electronic controls, injector support plate 8 is lowered to its operating position and because the injector support plate 8 holes no longer align with the new injector alignment plate 1, the injectors remain above the new injector alignment plate 1.

The injector support plate 8 corresponding with the newly placed injector alignment plate 1 is selected and a thin flat aluminum sheet with no holes (not shown) is placed on top of the new injector support plate 8. The new injector support plate 8 with the aluminum sheet covering the holes is placed on top of the injector support plate 8 to be substituted and gently pushed, raising injectors 6 from the plate being substituted and letting them slide onto the plate being inserted. When the new injector support plate 8 is in position, the injector support plate 8 being substituted can be easily removed by sliding it from beneath the newly inserted injector support plate 8. The aluminum sheet previously placed on the newly inserted injector support plate 8 should now be gently slid laterally off of the injector support plate 8, manually guiding injectors 6 row by row into their appropriate holes.

After the aluminum plate has been removed from the injector support plate 8 and all injectors 6 are inserted into the appropriate holes the injection machine is ready to vaccinate the next eggs 13. The plate exchange operation should take less than 10 minutes to perform.

The present invention has been described with reference to certain preferred and alternative embodiments that are intended to be exemplary only and not limiting to the full scope of the present invention as set forth in the appended claims.

I claim:

1. An apparatus for an in-egg vaccinator to support, align and secure a plurality of injectors above a plurality of eggs on an incubator flat, comprising: an injector support plate operable to support the injectors, wherein the injector support plate is operable to guide the injectors to the eggs being injected, and wherein the injectors each comprise a cap and an electronic sensor embedded in each cap, and the injector support plate further comprises an upper surface that serves as a support for the injector caps and provides contact for the electronic sensors; and an injector alignment plate to position the injectors over a plurality of eggs, wherein the apparatus is operable to send a signal that vaccine may be sent to an injector when the sensor corresponding to such injector loses contact with the injector support plate surface.

2. The apparatus of claim 1, comprising a plurality of interchangeable injector support plates, wherein each of the injector support plates corresponds to a particular egg flat configuration.

3. The apparatus of claim 1, further comprising at least one pneumatic cylinder attached to a support, wherein said support is attached to the injector support plate, and wherein the pneumatic cylinder is operable to move the injector support plate vertically, and to lower the injectors until they are resting on the eggs to be vaccinated and with injectors being lifted from the top of the plate and after the injection, the pneumatic cylinder is operable to raise the injector support plate to remove the injectors from their resting position on top of the eggs.

4. The apparatus of claim 1, operable to send a signal that vaccine should not be sent to an injector when the sensor corresponding to such injector continues to maintain contact with the injector support plate surface.

5. The apparatus of claim 1, further comprising an injector alignment plate, wherein the injector alignment plate comprises a configuration that corresponds to the configuration of the egg locations on the incubator flat, and wherein the injector alignment plate is operable to align the injectors correctly over the eggs to be vaccinated.

6. The apparatus of claim 5, further comprising a plurality of injector alignment plates, wherein each injector alignment plate corresponds to a particular egg configuration on the incubator flat.

7. The apparatus of claim 5, further comprising a vaccinator structure, and further comprising needles in communication with the injectors, wherein the injector alignment plate is affixed to the vaccinator structure such that the vaccinator structure absorbs vibrations from the injector alignment plate caused by the needles penetrating the eggs.

8. The apparatus of claim 5, further comprising a vaccinator structure, and wherein said injector alignment plate is affixed to the vaccinator structure by means of at least one quick connect fastener to facilitate the exchange of the injector alignment plate such that one apparatus may be used with incubator flats that have different egg configurations.

9. The apparatus of claim 5, wherein the injector alignment plate is operable to guide the injectors through the openings to the eggs located in the incubator flat just below the injector alignment plate.

10. The apparatus of claim 9, wherein the injector alignment plate is positioned below the injector support plate nearest the eggs, in a position closest to the needles that will penetrate the eggs, and therefore in the best position to secure the injectors to avoid lateral movements during the process of penetrating the egg for vaccination.

11. The apparatus of claim 9, further comprising a plurality of air tubes, and wherein the injector alignment plate comprises cavities in the interior between and perpendicular to the rows of openings for the injectors to receive the air tubes.

12. The apparatus of claim 11, wherein the air tubes comprise an expandable material such that, when inserted into the spaces in the injector alignment plate and inflated they are of a size that occupies all the spaces, so as to maintain, when inflated, the injectors in a rigid position.

13. The apparatus of claim 12, wherein the air tubes, when deflated, become flat, permitting free movement of the injectors through the injector alignment plate.

14. The apparatus of claim 12, wherein the air tubes further comprise end connections, and further comprising pneumatic valves attached at the air tube end connections, wherein the pneumatic valves are operable to rapidly inject compressed air into the air tubes and thereby ensure uniform distribution of air inside the air tubes.

15. The apparatus of claim 12, wherein the air tubes further comprise end connections, and further comprising pneumatic valves attached at the air tube end connections, wherein the pneumatic valves are operable to allow rapid removal of compressed air from the air tubes.

16. The apparatus of claim 1, further comprising a fine metal plate of about the same size as the injector support plate positioned with respect to the injectors to support the injectors during an exchange of the injector support plate for a second injector support plate.

* * * * *